No. 630,802. Patented Aug. 8, 1899.
E. S. DECKER.
CONVEYER.
(Application filed Feb. 24, 1896. Renewed May 9, 1898.)
(No Model.) 2 Sheets—Sheet 2.
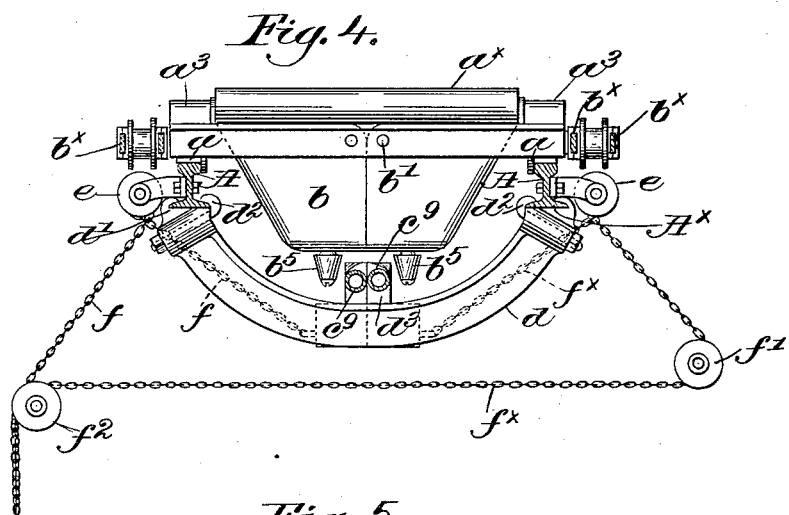
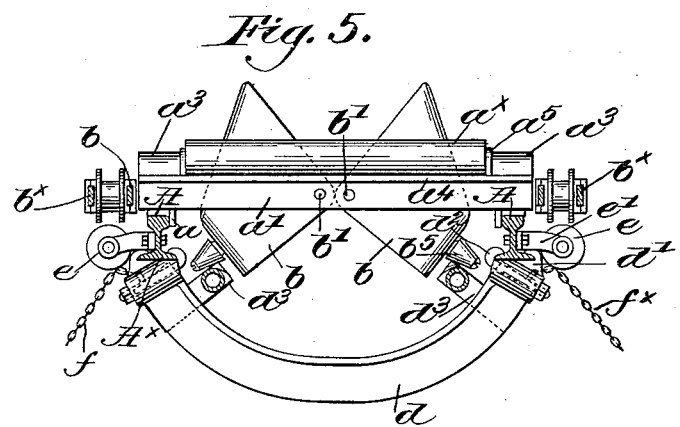
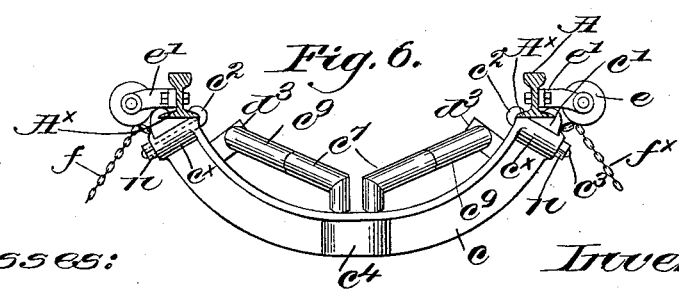
Witnesses:
A. C. Harmon.
Thomas F. Drummond.
Inventor:
Edwin S. Decker.
by Crosby Gregory
attys.

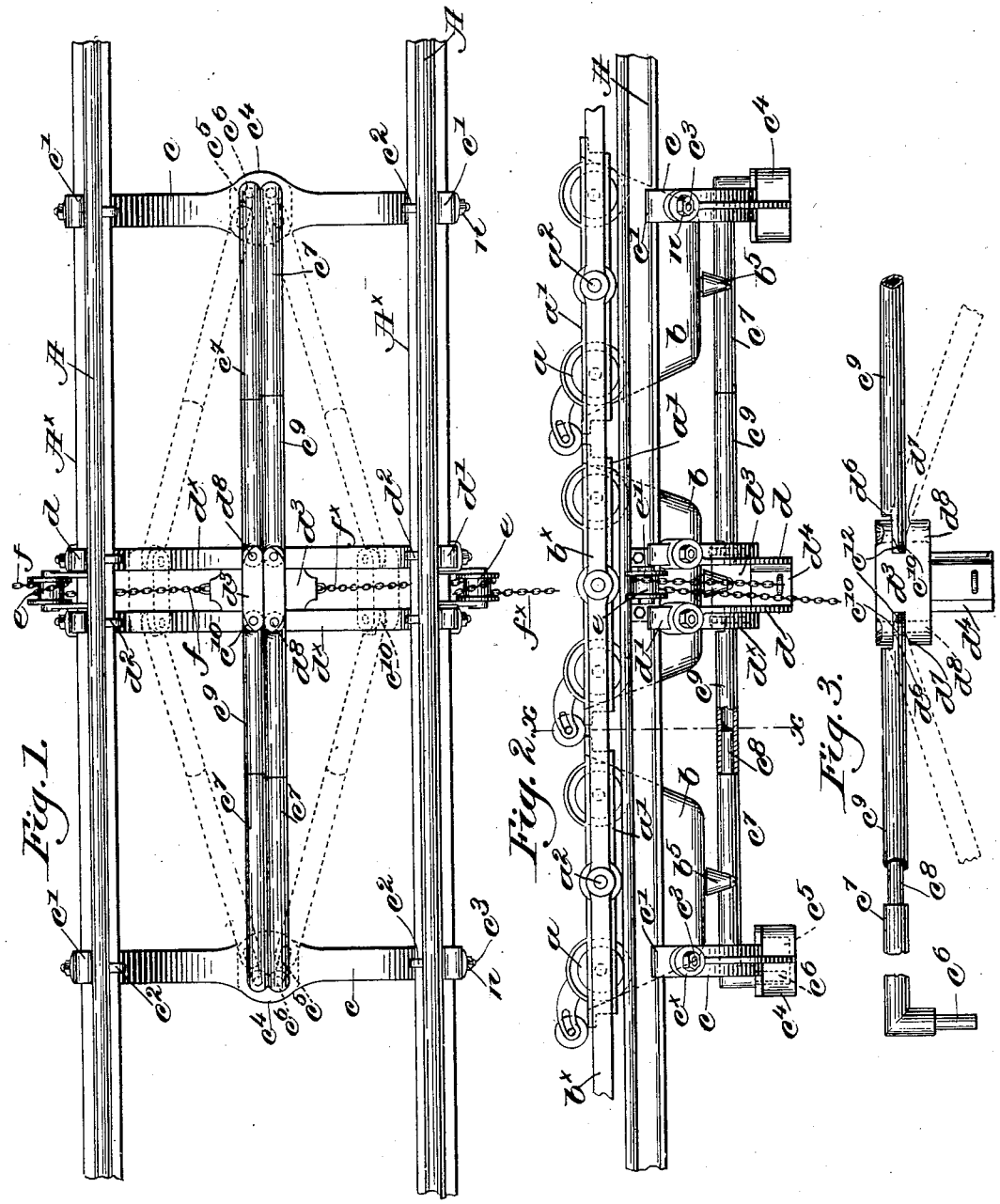

UNITED STATES PATENT OFFICE.

EDWIN S. DECKER, OF NEW YORK, N. Y., ASSIGNOR TO THE STEEL CABLE ENGINEERING COMPANY, OF MAINE.

CONVEYER.

SPECIFICATION forming part of Letters Patent No. 630,802, dated August 8, 1899.

Application filed February 24, 1896. Renewed May 9, 1898. Serial No. 680,240. (No model.)

*To all whom it may concern:*

Be it known that I, EDWIN S. DECKER, of New York, county of New York, and State of New York, have invented an Improvement in Conveyers, of which the following description, in connection with the accompanying drawings, is a specification, like letters on the drawings representing like parts.

This invention relates to endless conveyers for carrying coal, grain, ore, &c., from place to place by means of a series of connected buckets; and it has for its object more particularly the production of simple and readily-controlled means for discharging the contents of the buckets at desired points.

The discharging means may be instantly rendered operative or inoperative at will, and I have herein shown my invention as embodied in a conveyer system wherein the buckets are separable in the direction of travel.

Figure 1 is a top or plan view of a section of the guide rails or supports of one form of conveyer system with my invention applied thereto. Fig. 2 is a side view of the apparatus shown in Fig. 1, a series of connected buckets being shown in this figure. Fig. 3 is an enlarged detail of a part of the discharging means. Fig. 4 is a transverse sectional view of the apparatus shown in Fig. 2, taken on the line $x$ $x$ in said figure, looking to the right. Fig. 5 is a similar transverse sectional view with the discharging mechanism in operation, one of the buckets being shown as opened to discharge its contents; and Fig. 6 is an end view of the discharging mechanism in operative position.

I have herein shown the conveyer system proper as comprising suitable side rails or tracks A, upon which travel the wheels $a$ of a series of open frames or trucks $a'$, herein shown as connected by links $b^\times$, pivoted to the trucks at $a^2$, thus forming an endless chain of trucks, the tracks A leading from point to point, as desired, the pivots $a^2$ permitting the frames and buckets to remain in a horizontal position when passing from one to another level. Guards $a^3$ are shown on the frames $a'$, projecting over the wheels and serving to protect them from the material when being loaded into the buckets. Each frame $a'$ has at its end a projecting lip $a^4$ to nearly close the space between adjacent frames, and a roll $a^\times$ is mounted at one end of each frame in slotted arms $a^5$, said roll normally resting on and overlapping the space between the lips $a^4$ of two adjacent buckets, this construction not being herein claimed, however, as it forms a part of the subject-matter and claims of another application, Serial No. 557,068, filed by me. Each bucket herein, as in said application referred to, consists of two like separable members or halves $b$ $b$, journaled at $b'$ in the ends of the frame or truck $a'$, the journals being so located that the bucket members will be normally closed by gravity, and inasmuch as the line of separation of the parts of each bucket is in the line of bucket travel or longitudinally of the bucket I have hereinafter termed said buckets "longitudinally separable."

When a bucket arrives at the discharging-point, means must be provided for positively separating the members $b$, as shown in Fig. 5, in a direction transverse to the line of bucket travel, and I have herein shown simple and effective devices for accomplishing this object. At the desired point I secure to the rails A or otherwise two transverse braces $c$, said braces being herein shown as provided with fixed jaws $c'$ and movable jaws $c^2$ to embrace the base-flanges $A^\times$ of the rails, the movable jaws of the clamps being tightened by means of nuts $n$, screwed onto the threaded shanks $c^3$ of the jaws $c^2$, said shanks being extended through housings $c^\times$ on the braces $c$. By loosening the jaws the braces can be moved along the rails or applied thereto at any desired point, said braces $c$ in Figs. 1 and 2 being shown as separated by somewhat less than the combined length of three of the bucket-trucks $a'$.

Midway between the braces $c$ a pair of parallel braces $d$, having clamping-jaws $d'$ $d^2$, are secured to the rails A, but only a short distance apart, the braces $c$ and $d$ being bent downward to allow the free passage of the buckets thereover. The top flanges $d^\times$ of the intermediate braces $d$ form guides for two substantially T-shaped slide-blocks $d^3$, the stems $d^4$ thereof depending between the braces $d$, and, as shown best in Fig. 5, chains or other flexible connections $f$ $f^\times$, secured at their free ends to the blocks $d^3$, are carried over sheaves $e$ at the outer ends of said braces, one of the connections $f^\times$ being passed over a guide-sheave $f'$ and then back beneath the tracks and over a second sheave $f^2$, over which the other connection $f$ is also passed. The sheaves $e$ are rotatably mounted in brackets $e'$, bolted or otherwise secured to the rails A in such manner that the sheaves are located at the ends and between the vertical planes of the braces $d$. By pulling on the connections $f f^\times$ the two slide-blocks $d^3$ will be moved in opposite directions from the position shown in Fig. 4 to that shown in Figs. 5 and 6 and in dotted lines, Fig. 1. The slide-blocks $d^3$, with their actuating connections $f f^\times$, constitute a controlling device for the discharging means.

The braces $c$ are enlarged at their centers at $c^4$ and provided with inwardly-diverging slots $c^5$, which receive loosely therein the downturned reduced ends $c^6$ (see dotted lines, Figs. 2 and 3) of arms $c^7$, preferably reduced at their free ends at $c^8$ to form rotatable joints with hollow bars $c^9$, the opposite ends of which are flattened at $c^{10}$ to enter slots $d^6$ in the slide-blocks $d^3$. Referring to Fig. 3, it will be seen that the ends $c^{10}$ are beveled at $c^{12}$ on their upper faces and that the bottoms of the slots $d^6$ are outwardly beveled at $d^7$ to permit movement of said bars $c^9$ into dotted-line position, pins $d^8$ connecting the bars with the slide-blocks.

Referring to Fig. 1, it will be seen that when the slide-blocks $d^3$ are separated and moved into dotted-line position, as described, the bars $c^9$ and arms $c^7$ will diverge from the centers of the braces $c$ to the upper ends of the braces $d$, forming directing tracks or guideways for rolls $b^5$, located on the exterior of the separable bucket members $b$. When the directing tracks or guideways are in parallelism, as shown in full lines, Figs. 1 and 4, said tracks or guideways constituting expansible members of the discharging mechanism for the buckets, the rolls $b^5$ pass on each side thereof and preferably out of contact therewith; but when separated, as shown in dotted lines, Fig. 1, the two rolls on each bucket will be gradually separated as the bucket is moved from the apex $c^4$, the upward inclination of the guideways to the tops of the braces $d$ being in the path traveled by said rolls $b^5$ in moving from closed position, Fig. 4, to open position, Fig. 5. The bucket being fully opened over the braces $d$, the contents will be dumped, and as the bucket continues to move in the same direction the opposite ends of the guideways gradually converge and also incline to the center of the other brace $c$, permitting the bucket members $b$ to gradually close again. In this manner the contents of one bucket after another is dumped as long as the discharging mechanism is maintained in operative position.

When it is desired to let the buckets pass without dumping, as may be sometimes desirable, the flexible connections $f f^\times$ are slackened, whereby the slide-blocks $d^3$ and their guideways will return to inoperative position, and the buckets may then pass without being discharged.

The discharging mechanism may be readily moved from one to another location by means of the clamps, the brackets $e'$ of course being moved correspondingly, and likewise the guide-sheaves $f' f^2$.

My invention is not restricted to the exact construction shown, as the same may be modified without departing from the spirit and scope of my invention.

The slot-and-pin connection between the arms $c^7$ and the braces $c$ permit the necessary longitudinal movement of the guideways or expansible discharging members when being moved into operative or inoperative position, and the rotation of the bars $c^9$ on said arms prevents twisting of the parts at such times.

Having fully described my invention, what I claim, and desire to secure by Letters Patent, is—

1. In a conveyer apparatus, a series of connected, separable two-part buckets, discharging members to act upon one after another of the moving buckets to open the same, and means to separate or close said members, substantially as described.

2. In a conveyer apparatus, a series of connected, longitudinally-separable two-part buckets, discharging means therefor, comprising expansible members to act upon and open the moving buckets one after another, and a controlling device for the said members, substantially as described.

3. In a conveyer apparatus, a series of connected longitudinally-separable two-part buckets, and bucket-discharging mechanism, including expansible members to act upon and open the moving buckets one after another, substantially as described.

4. In a conveyer apparatus, a series of connected, longitudinally-separable buckets, discharging members adjacently pivoted at their outer ends, and means to separate and elevate the inner ends of said members, whereby the buckets will be opened one after another, substantially as described.

5. In a conveyer apparatus, a series of connected longitudinally-separable buckets, two pairs of guide-arms, each pair being pivoted at the outer ends, connections between the inner ends of the pairs, and means to separate said connected inner ends, whereby the guide-arms will diverge from each end to the center thereof, to gradually open and thereafter control closure of the moving buckets, substantially as described.

6. In a conveyer apparatus, a series of connected two-part buckets, separable in a direction transverse to the line of bucket travel, discharging mechanism below the path of the buckets and comprising a pair of guide-arms adjacently fulcrumed at their outer ends, a transverse upturned brace, slide-blocks oppositely movable thereon, connections between said blocks and the inner ends of the discharging-arms, and means to separate said slide-blocks and move them along the upturned ends of the brace, whereby the arms will be diverged and upwardly inclined in the direction of bucket travel, to open said buckets one after another, substantially as described.

7. In a conveyer apparatus, supporting-tracks, a series of connected bucket-trucks movable thereon, two-part longitudinally-separable buckets mounted in the trucks, and discharging mechanism for the buckets, comprising transverse braces upturned at their ends and adapted to be clamped to the track-rails, expansible bucket-engaging members mounted on the said braces, below the moving buckets, and means to diverge said members in the direction of movement of and to thereby engage and separate the parts of one bucket after another, to discharge their contents, substantially as described.

In testimony whereof I have signed my name to this specification in the presence of two subscribing witnesses.

EDWIN S. DECKER.

Witnesses:
 JOHN C. EDWARDS,
 THOMAS J. DRUMMOND.